March 9, 1943.  C. W. MONTGOMERY  2,313,661
ISOMERIZATION AND ALKYLATION OF PARAFFINS
Filed Feb. 12, 1942
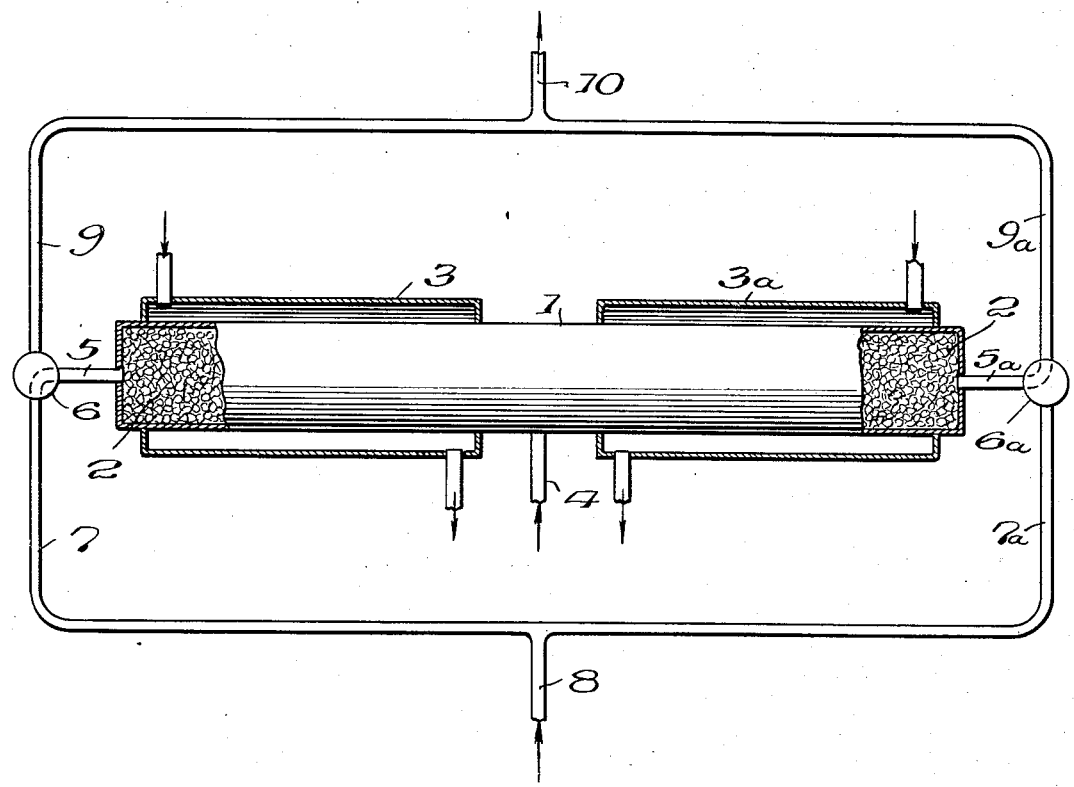
Inventor
Charles W. Montgomery,
By A. M. Houghton
his Attorney Patented Mar. 9, 1943

2,313,661

UNITED STATES PATENT OFFICE 2,313,661

ISOMERIZATION AND ALKYLATION OF PARAFFINS

Charles W. Montgomery, Oakmont, Pa., assignor to Gulf Research & Development Company, Pittsburgh, Pa., a corporation of Delaware Application February 12, 1942, Serial No. 430,674

7 Claims. (Cl. 196—10)

This invention relates to the isomerization and alkylation of paraffins; and it comprises passing the vapor of a normal paraffin containing 4 to 5 carbon atoms per molecule through a hot zone in contact with an aluminum halide catalyst at an elevated temperature sufficient to cause substantial isomerization of said normal paraffin and substantial vaporization of said aluminum halide, passing the resulting mixture of paraffins and aluminum halide, in admixture with at least one lower olefin, in vapor form through a cool zone in contact with an aluminum halide catalyst at a reduced temperature sufficiently low to cause condensation of at least the major part of the aluminum halide vapor introduced into said cool zone, but sufficiently high to maintain in the vapor phase substantially all of the hydrocarbons therein, affecting alkylation in the cool zone, ceasing the flow of materials through the hot and cool zones before the production of isoparaffin in the hot zone is insufficient to cause alkylation of substantial amounts of olefin in the cool zone, heating said cool zone to and maintaining it at said elevated temperature, cooling said hot zone to and maintaining it at said reduced temperature, and passing said vapor of normal paraffin through the hot zone and passing the resulting vapor mixture, in admixture with said lower olefin, through the cool zone in vapor form to cause isomerization and catalyst vaporization in the hot zone and alkylation and catalyst condensation in the cool zone; all as more fully hereinafter set forth and as claimed.

The lower isoparaffins, such as isobutane and isopentane, may be alkylated with the lower olefins, such as ethylene, propylene or the butylenes, in the presence of a suitable catalyst to produce higher isoparaffins boiling in the gasoline boiling point range. This process is much used to produce high octane aviation grades of gasoline. The reaction mixture or alkylate may be used directly as an aviation gasoline or it may be added to lower grade gasoline, such as straight run gasoline, to increase the octane number thereof.

However, the supply of lower isoparaffins for this process is limited and means of producing isoparaffins are much sought after. One method of producing isoparaffins comprises contacting a normal paraffin with an aluminum halide catalyst, such as aluminum chloride or aluminum bromide. Isomerization of the normal paraffin to the isoparaffin results. However, this procedure of isomerization, to be sufficiently productive of isoparaffins for commercial purposes, should be carried on at elevated temperatures, and at such elevated temperatures the aluminum halide catalysts vaporize. This is particularly so in the isomerization of normal butane in the presence of aluminum chloride. Normal butane is best isomerized to isobutane in contact with aluminum chloride by the use of temperatures of about 100° to 200° C. At such temperatures, aluminum chloride vaporizes very rapidly.

As a result of such vaporization of aluminum halide, catalyst is lost from the reaction zone and the reaction rate decreases. Moreover, the aluminum halide vapors recondense in cooler portions of the apparatus, causing stoppage of lines, valves and the like, and the vapors are frequently corrosive to equipment used in the recovery of reacted and unreacted hydrocarbons.

I have now found, however, a method of obviating these difficulties, by combining isomerization with alkylation, conducting the isomerization step at an elevated temperature such as to promote vaporization of the aluminum halide, conducting the alkylation step at a temperature such as to cause condensation of the aluminum halide vapor, and periodically interrupting the flow, cooling the isomerization zone, heating the alkylation zone, and reversing the direction of flow. By so doing, as explained hereinbelow, the vaporization of aluminum halide catalysts is made an advantage rather than a disadvantage of the process.

In accordance with my invention, the vapor of n-butane or n-pentane, or of both, is passed through a hot zone containing an aluminum halide catalyst and maintained at an elevated temperature sufficient to cause rapid isomerization and to cause substantial vaporization of the aluminum halide, the resulting paraffins and aluminum halide, in admixture with one or more lower olefins, are then passed in vapor form through a cool zone containing an aluminum halide catalyst and maintained at reduced temperature sufficiently low to cause condensation of the aluminum halide vapor but sufficiently high to maintain in the vapor phase substantially all of the hydrocarbons therein, isoparaffin is alkylated in the cool zone, and before the aluminum halide concentration in the hot zone becomes so low as to cause production of insufficient isoparaffin to combine with or alkylate substantial quantities of olefin in the cool zone, the flow is interrupted, the cool zone is heated to and maintained at said elevated temperature, the hot zone is cooled to and maintained at said reduced temperature, and the paraffin and olefin are caused to pass through said zones in the reverse direction to cause isomerization and catalyst vaporization in the hot zone and alkylation and catalyst condensation in the cool zone.

By such means, the prior disadvantage of aluminum halides as isomerization catalysts resulting from their volatility is obviated and, moreover, their property of high volatility is turned into an advantage. Because of the constant vaporization and redeposition of the aluminum halide catalyst, fresh catalyst surfaces are constantly formed and presented to the reactants. High catalyst activity is thus sustained longer than in systems where, by the use of pressure, the vaporization of the aluminum halide is repressed. Also, since in both the isomerization and alkylation zones there is a relatively large amount of aluminum halide vapor mixed in with the reactant vapors, a substantial amount of reaction occurs by contact of the vapor phase reactants with the vapor phase catalyst. The intimacy of contact secured between the vapor phase reactants and the vapor phase catalyst promotes the rate of reaction considerably.

The isomerization step of my procedure is carried out in the vapor phase and the alkylation step is also carried out primarily if not entirely in the vapor phase. The bulk of the products of alkylation, even of isobutane and ethylene, is normally liquid. However, by employing sufficiently low pressures in the cool (alkylation) zone, substantial condensation of alkylate, even that produced from pentane and $C_4$ olefins, can be avoided. Advantageously, I employ a pressure, a temperature and a flow rate in the alkylation step of my procedure such that substantial condensation of alkylate is avoided.

The process of my invention may be advantageously carried out by passing the vapor of normal butane or normal pentane, or both, advantageously containing a minor amount of HCl or other hydrogen halide or hydrogen halide-yielding promoter, through or over a body of solid catalyst comprising an aluminum halide, advantageously aluminum chloride, deposited on an inert solid such as pumice, silica or fuller's earth, at a temperature of about 100° to 200° C., thereby obtaining isomerization, then mixing the cool vapor of a lower olefin, such as ethylene or propylene, with the isomerization product (thereby cooling the isomerization product somewhat) and passing the resulting mixture of vapors over and through a similar body of solid catalyst at a temperature of about 50° to 100° C. and at a pressure sufficiently low to maintain all of the hydrocarbons in the vapor phase. In this process, the concentration of the aluminum halide in the solid catalyst is controlled and maintained within certain limits to obtain high yields and other advantageous results.

In general, it has been found that solid catalysts containing 30 to 50 per cent by weight of aluminum halide are advantageous in both the isomerization and alkylation reactions. Accordingly, the solid catalyst is initially prepared by impregnating 70 to 50 parts of an inert solid, such as pumice, etc., with 30 to 50 parts of aluminum halide, advantageously aluminum chloride, to give 100 parts of impregnated solid, the parts being parts by weight. For instance, one advantageous solid catalyst is impregnated pumice containing 30 pounds of $AlCl_3$ per 70 pounds of inert solid. Likewise, solid catalysts containing 40 or 50 per cent of aluminum chloride by weight are advantageous in my process. That is, the solid catalyst, as initially prepared, has a concentration of aluminum halide which is advantageous for a given run and which is desirable as an average concentration in that run.

Of course, during each cycle or pass of the run, the actual concentration of the aluminum halide varies from a maximum above to a minimum below the optimum concentration of aluminum halide, due to the vaporization and condensation of the aluminum halide in the hot and cool zones, respectively; the concentration of aluminum halide decreasing from a maximum to a minimum value in the isomerization (hot) zone and increasing from a minimum to a maximum value in the alkylation (cool) zone. By controlling the maximum and minimum concentrations within certain limits by suitable means, an average concentration of aluminum halide approximating the optimum concentrations for the isomerization and alkylation reactions can be readily established and maintained. For instance, if the optimum concentration for obtaining the isomerization and alkylation desired is 30 per cent of aluminum chloride, an average concentration approximating this value can be readily obtained by operating with a minimum and maximum concentration of 20 per cent and 37.3 per cent of aluminum chloride, respectively. In some cases a minimum concentration of 15 per cent may be used; the maximum concentration being accordingly increased by the additional $AlCl_3$ vaporized in the hot zone and condensed in the cool zone. However, in general, it is best to limit the variation above and below the optimum or average concentration to a somewhat narrow range; the maximum and minimum concentrations being held as close to the optimum concentration as practical without unduly shortening the time of each cycle. This is particularly true when the optimum concentrations are somewhat higher, say 40 or 50 per cent aluminum chloride. For instance, when the optimum concentration is 50 per cent of aluminum chloride, a minimum concentration of 33 per cent and a maximum concentration of 60 per cent gives a reasonably long cycle or pass with an average concentration of approximately 50 per cent. As stated, the concentrations of aluminum halide are controlled by suitable means. This is usually done by adjusting the temperatures and pressures employed as well as controlling the period of each cycle or pass. In doing so, the minimum and maximum concentrations are adjusted to and correlated with the initial concentration of aluminum halide in the solid catalyst prepared as described ante.

In general, at the commencement of operation, the solid catalyst contains between 30 to 50 per cent of aluminum halide as initially prepared. Accordingly it is necessary to run a few preliminary cycles or passes to establish the minimum and maximum concentration of aluminum halide under operating conditions. In doing so, the other conditions such as temperature, pressure, rate of flow, etc., are also adjusted to obtain uniform, thorough reactions and to produce high yields of the desired alkylates. This preliminary processing and adjustment is known as "lining out" the process or system and is done to establish controlled operation, including the establishment of proper maximum and minimum concentrations of aluminum halide in the solid catalysts which are then maintained during the subsequent cycles or passes; the flow being repeatedly reversed to continuously produce the alkylates desired.

Advantageously, in such a process, a given pass (or cycle) is terminated, and the hot zone is cooled and the cooled zone is heated, before the concentration of aluminum halide in the hot zone is less than about 15 per cent and that in the cool zone is greater than about 60 per cent, percentages being by weight on the solid catalyst in said zone. If a pass is continued longer than this, the rate of isomerization becomes undesirably low and the cool zone does not condense the aluminum chloride vapors as efficiently as might be desired. Also if a pass is so prolonged, unsaturates will begin to appear in the effluent from the alkylation zone.

My invention will be better understood by reference to the accompanying diagrammatic drawing in which is shown, partly in elevation and partly in section, an apparatus for effecting the process of the invention.

In the drawing, a reaction chamber 1, containing a continuous body of solid catalyst 2, consisting of aluminum chloride deposited on pumice is surrounded by two temperature control jackets 3 and 3a, each of which is provided with inlets and outlets for heating or cooling fluids, as shown. Reaction chamber 1 is further provided with an inlet conduit 4 at its center and with inlet or outlet conduits 5 and 5a at its ends. Conduits 5 and 5a are connected to two-way valves 6 and 6a, respectively, and valves 6 and 6a are connected by conduits 7 and 7a, respectively, to an inlet conduit 8 and by conduits 9 and 9a, respectively, to an outlet conduit 10.

At the commencement of operation, the pumice in chamber 1 is charged with aluminum chloride in such manner that the amounts of aluminum chloride in the left-hand half and in the right-hand half are each about 30 per cent by weight on the total solid in the respective halves. A hot fluid is caused to pass through jacket 3 and a cool fluid is caused to pass through jacket 3a, thereby bringing the left-hand half of chamber 1 to and maintaining it at a higher temperature of about 100° to 200° C. and bringing the right-hand half of chamber 1 to and maintaining it at a lower temperature of about 50° to 100° C. Normal butane vapor containing about 10 mol per cent of HCl (on the mixture) is introduced through inlet conduit 8 under a pressure of about 1 to 30 atmospheres. Valves 6 and 6a are set so that the stream of vapors flows from inlet conduit 8 through conduit 7, valve 6 and conduit 5 into the left-hand half of chamber 1. The normal butane-HCl mixture traverses the left-hand (hot) half of chamber 1, the n-butane thereby undergoing isomerization to isobutane and the vapor stream picking up substantial quantities of aluminum chloride. The mixture of vapors (n-butane, isobutane, HCl, aluminum chloride) is then passed through the right-hand (cool) half of chamber 1. Ethylene is introduced through inlet conduit 4 into the stream of vapors entering the cool half of chamber 1 in proportions substantially less than 1 mol of ethylene per mol of isobutane. The temperature of the entering ethylene is sufficiently low so that the ethylene aids materially in or effects completely the cooling of the vapor mixture entering the cool half of chamber 1 to 50° to 100° C. Advantageously, an inert gaseous diluent, such as the ethane, is also introduced with the ethylene, thereby aiding in the cooling of the hot vapors from the isomerization zone.

The temperature in the cool half of chamber 1 is such that, at the prevailing pressure, substantially all of the aluminum chloride vapor condenses and relatively little of the hydrocarbons condenses. This temperature is also such that rapid alkylation occurs. The temperature chosen for alkylation in a given instance will depend upon a number of factors, such as pressure, the boiling range of the alkylate, such factors being correlated to obtain the results desired. The higher the pressure and the higher the boiling range of the alkylate, the greater must be the temperature in the alkylation zone in order to carry on alkylation in the vapor phase.

If desired, the ethylene may be added at a plurality of points spaced along the direction of flow of the stream of material, instead of at one point, as shown. Also, isobutane, such as recycled isobutane, may be added to the stream of material entering the cool half of chamber 2.

A mixture of paraffins and HCl substantially free from aluminum chloride is removed from the system through conduit 5a, valve 6a and conduits 9a and 10. The HCl and unreacted isobutane and n-butane may be separated by appropriate means (not shown) and recycled to the system and a suitable high octane gasoline fraction may be separated from the alkylation product by fractionation.

When the concentration of aluminum chloride in the hot half of chamber 1 has diminished to about 20 per cent and that in the cool half of chamber 1 has increased to about 37.8 per cent, the flow is interrupted, the right-hand half of chamber 1 is heated to and maintained at about 100° to 200° C. by causing hot fluid to pass through jacket 3a, and the left-hand half of chamber 1 is cooled to and maintained at about 50° to 100° C. by causing a cool fluid to pass through jacket 3. Valves 6 and 6a are then reversed and a stream of hydrocarbon, aluminum halide and HCl vapors is caused to pass through the system in exactly the same way as in the previous pass but in the reverse direction, until the opposite state of distribution of aluminum chloride exists as existed at the end of the first pass. A complete cycle is thus accomplished and operation thereafter is but a repetition of such a cycle. At the beginning of actual commercial operation, successive passes and successive cycles may not operate in precisely the same manner because a few passes are necessary to "line out" the system. After the system is once lined out, however, each pass is like the previous pass, but in reverse, and each cycle is like every other cycle, until conditions are changed or the catalyst activity is diminished.

A certain, though not a substantial amount of aluminum halide may pass out of chamber 1 into other parts of the system. Therefore, appropriate means for recovery and removal or restoration of escaped or trapped aluminum chloride may be used.

The apparatus and procedure described above with reference to the drawing employing a single continuous bed of catalyst and vapor phase reaction throughout, are the most advantageous embodiments of my invention. However, in place of a single continuous bed of catalyst, other forms of catalyst disposition may be employed, though with less advantage, such as two distinct beds enclosed in a single casing or even two distinct beds enclosed in separate casings and connected by a pipe or other suitable conduit. A marked advantage, however, of the form illustrated is that the aluminum halide vapors are confined to the reaction zones, not being passed through any dead space wherein they are apt to condense and cause some difficulty.

What I claim is:

1. A method of producing isoparaffins, which comprises passing the vapor of at least one normal paraffin containing 4 to 5 carbon atoms per molecule through a hot zone in contact with an aluminum halide catalyst at an elevated temperature sufficient to cause substantial isomerization of said normal paraffin and substantial vaporization of said aluminum halide, passing the resulting mixture of paraffins and aluminum halide, in admixture with at least one lower olefin, through a cool zone in contact with an aluminum halide catalyst at a reduced temperature sufficiently low to cause condensation of at least the major part of the aluminum halide vapor introduced into said cool zone, but sufficiently high to maintain in the vapor phase substantially all of the hydrocarbons therein, effecting alkylation in said cool zone, ceasing the flow of materials through the hot and cool zones before the production of isoparaffin in the hot zone is insufficient to cause alkylation with substantial amounts of olefin in the cool zone, heating said cool zone to and maintaining it at said elevated temperature, cooling said hot zone to and maintaining it at said reduced temperature, and passing said vapor of normal paraffin through the heated original cool zone and passing the resulting vapor mixture, in admixture with said lower olefin, through the cooled original hot zone to cause isomerization and catalyst vaporization in the hot zone and alkylation and catalyst condensation in the cool zone.

2. The method of claim 1, wherein said normal paraffin is normal butane.

3. The method of claim 1, wherein said normal paraffin is normal pentane.

4. The method of claim 1, wherein said aluminum halide catalyst is aluminum chloride.

5. The method of claim 1, wherein said aluminum halide catalyst is aluminum bromide.

6. A method of producing isoparaffins, which comprises passing the vapor of normal butane through a hot zone in contact with aluminum chloride dispersed on an inert solid at a temperature of about 100° to 200° C., passing the resulting mixed vapors of normal butane, isobutane and aluminum chloride, in admixture with ethylene, in vapor form, through a cool zone in contact with aluminum chloride dispersed on an inert solid at a temperature of about 50° to 100° C. sufficiently high to maintain the reactants and reaction products in the vapor phase, but sufficiently low to cause substantially complete condensation of the aluminum chloride vapor introduced into said cool zone, ceasing the flow of materials through the hot and cool zones before the production of isobutane in the hot zone is insufficient to cause alkylation with substantial amounts of ethylene in the cool zone, heating said cool zone to and maintaining it at about said temperature of about 100° to 200° C., cooling said hot zone to and maintaining it at said temperature of about 50° to 100° C. and passing the vapor of normal butane through the heated original cool zone and passing the resulting vapor mixture, in admixture with ethylene, through the cooled original hot zone to cause isomerization and catalyst vaporization in the hot zone and alkylation and catalyst condensation in the cool zone.

7. In the production of isoparaffins by passing the vapor of normal butane through a hot zone maintained at about 100° to 200° C. and containing a solid catalyst comprising aluminum chloride dispersed on an inert solid, and passing the resulting mixed vapors of normal butane, isobutane and aluminum chloride, in admixture with ethylene, through a cool zone maintained at a temperature of about 50° to 100° C. sufficiently low to cause substantially complete condensation of the aluminum chloride vapors introduced thereinto but sufficiently high to maintain the hydrocarbon reactants and reaction products in the vapor phase, and containing a solid catalyst comprising aluminum chloride dispersed on an inert solid, the steps of maintaining in the hot zone a concentration of aluminum chloride, on the solid in said hot zone, not less than about 15 per cent nor more than about 60 per cent by weight, maintaining in the cool zone a concentration of aluminum chloride, on the solid in the cool zone, not less than about 15 per cent nor more than about 60 per cent by weight, and ceasing the flow of materials through the hot and cool zones, cooling the hot zone, heating the cool zone, and reversing the flow of materials, before the concentration of aluminum chloride, in the hot zone, is less than about 15 per cent and, in the cool zone, is greater than about 60 per cent, each by weight on the solid in the respective zones.

CHARLES W. MONTGOMERY.